Figure 1:
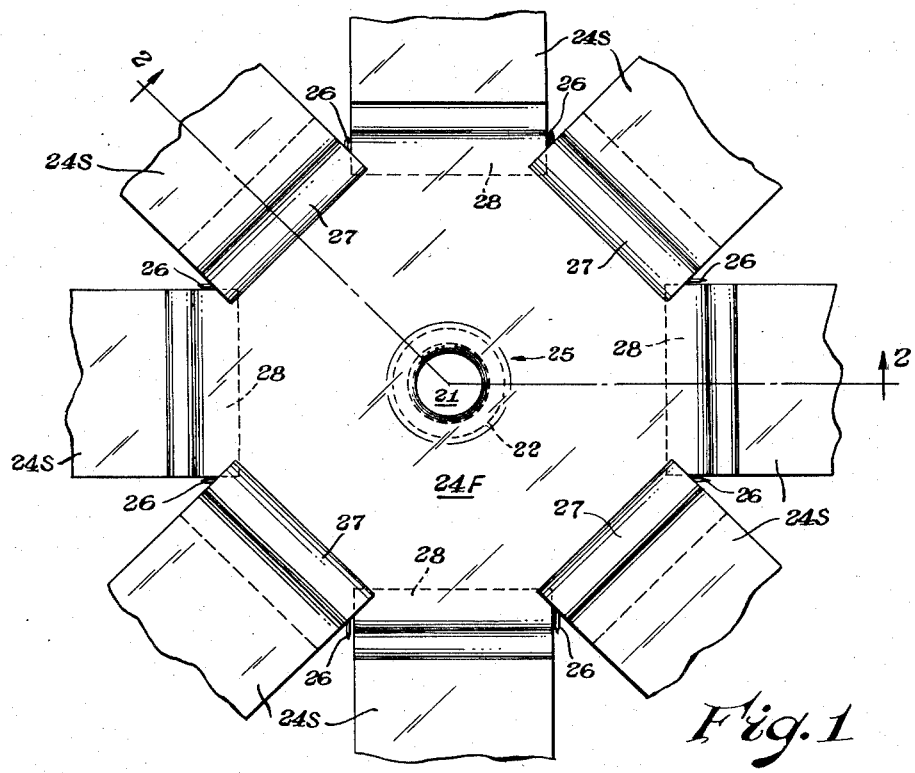

Sept. 23, 1958     M. O. LONGSTRETH     2,852,813
METHOD FOR HANDLING AND PROCESSING TUBULAR FILM
Filed March 16, 1956     4 Sheets-Sheet 1

Supply of film-forming material

INVENTOR.
Murrey O. Longstreth
BY
Griswold & Burdick
ATTORNEYS

Sept. 23, 1958 M. O. LONGSTRETH 2,852,813
METHOD FOR HANDLING AND PROCESSING TUBULAR FILM
Filed March 16, 1956 4 Sheets-Sheet 2

INVENTOR.
Murrey O. Longstreth
BY
Griswold & Burdick
ATTORNEYS

INVENTOR.
Murrey O. Longstreth
BY
Griswold & Burdick
ATTORNEYS

Sept. 23, 1958   M. O. LONGSTRETH   2,852,813
METHOD FOR HANDLING AND PROCESSING TUBULAR FILM
Filed March 16, 1956                                    4 Sheets-Sheet 4

INVENTOR.
Murrey O. Longstreth
BY
Griswold & Burdick
ATTORNEYS

United States Patent Office 2,852,813
Patented Sept. 23, 1958

2,852,813

METHOD FOR HANDLING AND PROCESSING TUBULAR FILM

Murrey O. Longstreth, Midland, Mich., assignor to The Dow Chemical Company, Midland, Mich., a corporation of Delaware Application March 16, 1956, Serial No. 571,930

20 Claims. (Cl. 18—57)

This invention relates to a novel method for handling and processing tubular film in the source of various manufacturing operations wherein flat film and similar sheet-like shaped articles are being prepared.

In addition to the various indigenously linear methods by which film may be formed, including extrusion, sheet casting and calendering techniques, film may also be formed by the extrusion of film-forming materials into an initially tubular or cylindrical shape. Such tubularly formed film, while remaining in a tubular shape, is commonly oriented by mechanical, pneumatic or hydraulic expanding means before being longitudinally slit and opened out to form flat film or sheets. In such practice, all other factors being equal, the circumference of the tubular film-forming means effectively predetermines the maximum attainable width of the resulting film. In both tubular and linear methods of film-formation it is necessary to extrude or otherwise form the film in a single direction. Thus, not only is the manufacturing potential of conventional film-producing apparatus confined by the practical dimensional limitations of the film-forming means which are incorporated in the apparatus but, due to the limited transversal stretching which may be obtained in sheets formed in a unidirectional manner, the resulting sheets, during their initial formation and treatment, may often be under unequal and non-uniform conditions of stress and tension in the various directions in their major plane. Such a condition may frequently be responsible for the films being obtained in a manufactured state with various undesirable characteristics of directional non-uniformity because of the difficulty in obtaining substantially uniform omnidirectional treatment of the film during its formation under the heterogeneous physical conditions which prevail.

It would be advantageous to provide a method for the handling and processing of tubularly formed film that could utilize conventional tubular film-forming means yet wherein the tubularly formed film could be converted to flat film or sheet at any rate at which the associated means for supplying the film-forming material is capable of delivery to the extrusion orifice. Such a method would facilitate the achievement of an extremely high film-manufacturing potential with minimized requirements for apparatus and space. It would also be desirable for such a method to be facile and easily adaptable to the practice and inclusion of various treatments, including liquid treatments, on the film during or subsequent to its initial formation. It would be additionally desirable to provide such a method that would not encumber the practice of tubular film formation and its subsequent conversion into flat sheets with the limitations of completely operating in a unidirectional manner that are ordinarily encountered. It would be particularly advantageous to provide a method for the handling and processing of tubular film in the course of various operations wherein it is converted into flat sheets and the like wherein a substantially uniform omnidirectional handling and treatment, or both, could be possibilitated during formation or processing of the film due to the achievement of essentially homogeneous and uniformly equal physical conditions of stress and tension in all directions in the major plane or in the major directions of the film during its conversion.

These desiderata and other advantageous results and benefits may be propitiously accomplished in accordance with the method of the present invention which comprises extruding a film-forming material into a tubularly formed film; omniradially flaring the tubularly formed film outwardly from a center through a ring-like flaring means as a unitary thin sheet being conducted in a discoid form; slitting the moving discoform flared sheet radially at fixed points spaced about its circumference and at about equal distances from the flaring means; grasping each of the thus-separated sheets individually and conveying them radially away from the center at a linear rate at least as great as the rate of formation of the central unitary sheet from the flared tubular film; and subsequently handling each of the thus-separated sheets as a unidirectionally formed, flat film sheet.

Conveniently, the discoform flaring of the tubular film may often be in a discoplanate fashion. It may also be convenient during the discoform flaring to simultaneously accomplish an orientation by stretching and conversion into flat film sheets of the tubularly formed film. Or, it may be advantageously practiced and performed in combination with other processing and treating steps on the film. Thus, a melt-extruded tubular film may be flared in a beneficial liquid treating bath for various purposes or a melt- or wet-extruded tubular film may be flared into the discoid sheet while it is immersed in a liquid treating bath before withdrawing the film from the bath or after withdrawing the tubular film from the bath for the flaring operation. Alternatively, a melt-extruded tubular film may be immersed in a treating bath while in tubular form before being flared into the discoid sheet according to the handling and processing method of the present invention.

Advantageously, the method of the present invention may be practiced in a somewhat analogous manner to the disclosure contained in the copending application of Murrey O. Longstreth and Turner Alfrey, Jr. for a Method and Apparatus for Producing Oriented Plastic Films, having Serial No. 493,178, now U. S. Patent No. 2,779,053, which was filed on March 9, 1955 using apparatus which is analogous and generally similar to the therein-disclosed apparatus but being implemented and adapted for the purposes of the present invention and differing specifically in the substitution of the tubular film flaring means for a radial, discoplanate film-forming device.

Thus, the present invention may be further delineated as being a method which comprises extruding a film-forming material into a tubularly formed film; omniradially flaring the tubularly formed film outwardly from a center through a ring-like flaring means as a unitary thin sheet in a discoid form; conducting the resulting discoform, unitary, central sheet into contact with a plurality of cutters disposed about equidistant from the center and spaced approximately symmetrically thereabout at angles of a circumscribing polygon to form a plurality of sheets having individually fixed widths which extend outwardly from the unitary central sheet; engaging each of the individual sheets in the bight of a corresponding set of draw rolls having essentially the same width as the engaged sheet, the several sets of rolls describing a closed polygon concentric with said center; driving all of said sets of rolls at the same peripheral speed to effect continuous and substantially uniform omnidirectional stress and tension in the major plane of said unitary, central sheet and in each of said outwardly extending sheets; and subsequently handling each of the outwardly extending sheets as a unidirectionally formed flat film sheet.

Figure 2:
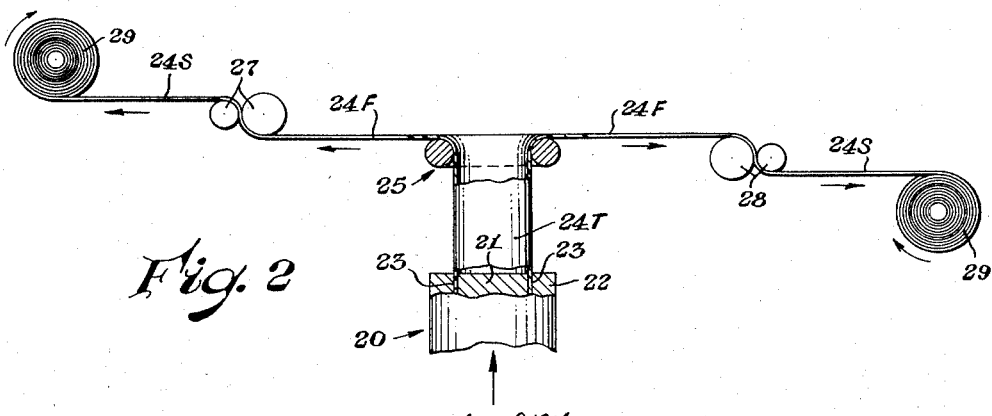
Figure 4:
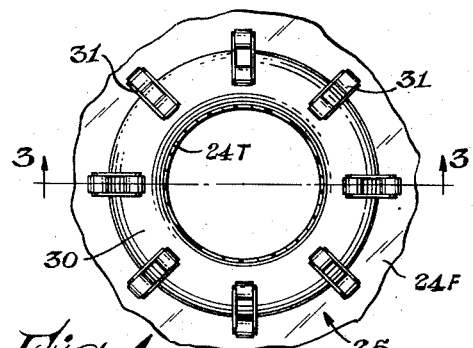
Figure 6:
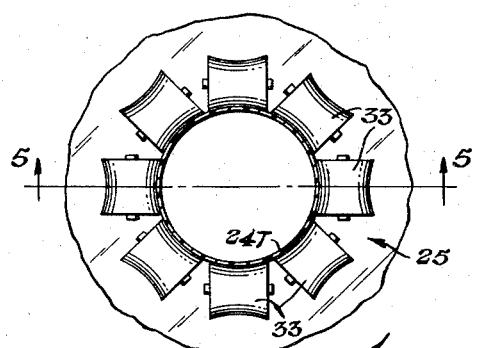
Figure 3:
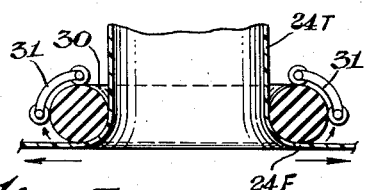
Figure 5:
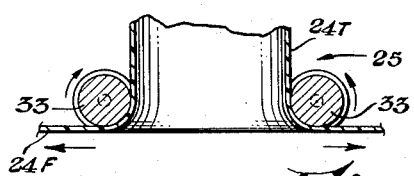
Figure 8:
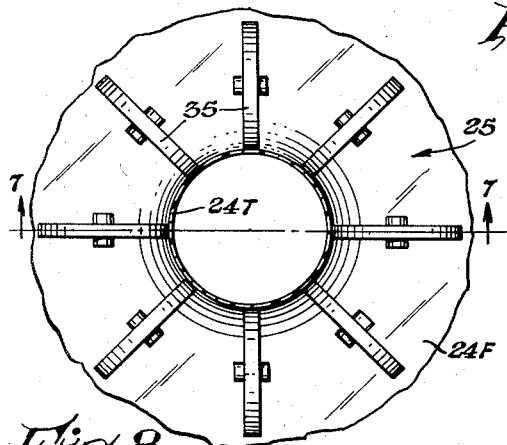
Figure 9:
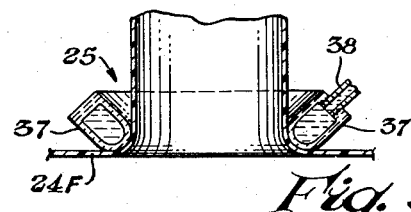
Figure 7:
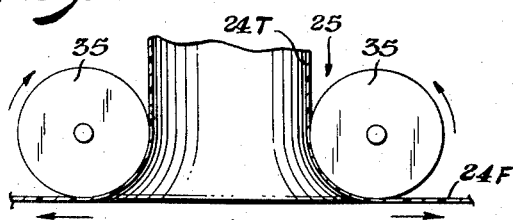
Figure 11:
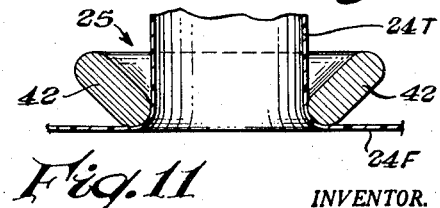

Further features and advantages of the invention will be apparent in the following description and specification, taken in connection with the accompanying drawing which illustrates the invention by several possible embodiments and in which, insofar as possible, like reference numerals refer to like parts and materials, wherein;

Figure 1 schematically represents a simplified plan view of an apparatus adapted to perform the method of the invention;

Figure 2 is a cross-sectional elevation of the apparatus taken along the line 2—2 in Figure 1;

Figures 3 through 11 schematically depict various flaring means which may be employed in the method of the invention in which Figures 3, 5 and 7 are cross-sectional illustrations taken along the lines 3—3, 5—5, and 7—7 in the inverted plan views of Figures 4, 6 and 8, respectively; and Figures 12 through 18 diagrammatically represent various treatments and arrangements which advantageously may be accomplished in combination with the handling and processing method of the present invention.

Any suitable tubular film-forming means or device or tubular extrusion die may be employed in the practice of the invention to prepare or obtain the tubularly formed film. Such an extrusion die is generally represented by the reference numeral 20 in the drawings and, as illustrated in Figures 1 and 2, comprises a central core 21 uniformly concentrically positioned within an outer barrel or shell 22 which may be the extension of a supply conduit for any desired film-forming material from a suitable forwarding or supplying means for the film-forming composition. A cylindrical or equivalent extrusion orifice 23 for formation of tubular film is provided in the annular space between the core 21 and outer shell 22. The film-forming material is passed under a suitable extrusion pressure from its supply source through the uniform cylindrical orifice 23 to form the tubular film 24T. The tubular film 24T is passed through a ring-like flaring means, indicated generally by the reference numeral 25, and omniradially flared outwardly as a unitary thin sheet 24F in a discoid form.

While diverse means may be adapted for slitting the unitary, discoform, flared film 24F and simultaneously or subsequently grasping the so-separated sheets to convey them radially away from the center for subsequent handling in various manners and for various purposes, it is particularly desirable to practice a technique which may be based upon and adapted from the Longstreth and Alfrey disclosure, supra, using a polygonal film handling and conveying means.

In this manner, an octagonal form of film cutting or slitting and grasping means may be employed although, as is apparent, any closed polygonal form may be similarly utilized provided the perpendicular bisectors of its several sides intersect at the center of the polygon. Ordinarily it is preferable for the film cutting and grasping means to be embodied in the form of a regular polygon comprising at least six sides.

Each side of the octagonal film cutting and grasping means depicted schematically in Figures 1 and 2 consists of a pair of takeaway or draw rolls which, in cumulative effect operating at the same peripheral rate of speed, uniformly draw and, if desired, attenuate or stretch the central, unitary, discoform, film sheet 24F omniradially away from the centrally disposed, ring-like flaring means 25 under substantially equal tension and stress in all directions in the major plane or dimensions of the film. Each pair of draw rolls grasps the film simultaneously with or shortly after its separation into the plurality of individually separated flat sheets 24S which are thereby forwarded for subsequent handling. The unitary flared film 24F may be slit into the individual flat films 24S by any suitable cutting means 26 which are spaced between adjacent ends of the draw rolls about equidistant from the center and at the angular apices of the polygonal form. Stationary knife edges or rotating cutting discs, for example, may be satisfactory. Preferably, as is illustrated, the pairs of draw rolls which are shown are alternately mounted above and below the major plane of the flared film sheet 24F, suitably in the positions shown in Figure 2 by the pair of rolls 27 above the film and the pair 28 therebelow. This arrangement, though not essential, permits a more expedient spacing of the rolls for providing an effective and equal tensioning influence about the enclosed perimeter of the polygon. If preferred, however, the draw rolls may be more remotely positioned from the cutters with intermediate guide means such as rolls or bars being employed if they are desired.

It is generally advantageous to stretch the unitary flared film 24F before it is slit, although if all or some portion of the stretching is preferred to be accomplished with the individual sheets 24S and a uniform stress condition in the film 24F is desired to be taken advantage of for purposes of some particular treatment simultaneous with the flaring, the unitary film 24F may be incompletely stretched or merely drawn under uniform tension without substantial stretching during its discoid formation. As is apparent, attenuation or stretching simultaneous with flaring of any film sheet may be accomplished readily by operating the rolls 27, 28 at greater peripheral rates than the rate at which the unitary film sheet 24F is being formed by flaring of the tubular film 24T.

A variety of ring-like means may be utilized for omniradially flaring the tubular film. The flaring means must be adapted to accommodate the flaring operation without tending to tear, scratch, crumple or otherwise damage or spoliate the film which, in many cases, may be in a relatively delicate and easily abused condition in the course of the flaring operation. Thus, as shown in Figures 3 and 4, the means 25 may comprise a toroidal roll 30 of an elastomeric material, such as rubber and the like, which is adapted to peripherally roll with the passing film being flared while encompassing and restraining the tubular film 24T during the operation. Suitable reaction members such as the circumferentially spaced, resiliently mounted rollers 31 may advantageously be employed for positioning and supporting the toroidal roll 30 to facilitate its flare-assisting function.

Similarly, as shown in Figures 5 and 6, a plurality of closely spaced, independently mounted rollers 33 that are arranged and circularly grouped to present a substantially continuous and essentially cylindrical or circular polygonal rotating surface may be suitably utilized for the purpose. Such rollers may be mounted in a freely rotatable manner or they may be driven rollers to facilitate passage of the film with a minimized frictional snubbing effect. In many instances, a corresponding number of wheels or rolls, independently rotatable, which are in individual radial alignment with the polygonal apices may provide a satisfactory function as a flaring means for the tubular film. Eight such wheels 35, which may also be idler or driven wheels, are depicted in Figures 7 and 8 as they might be adapted for employment in combination with an octagonal film slitting and grasping apparatus. The widely spaced wheels 35 in such a flaring device may at times distend the flared film along the radial lines through which it passes over the wheels. In such cases it may be advantageous to trim the edges of the individual sheets slightly when it is expedient to obtain the film product in first-quality or unblemished grades.

Figure 10:
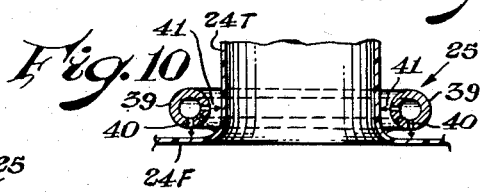

Other suitable embodiments for the ring-like flaring means 25 include hollow rings or other circular forms of a permeable, smooth surfaced material such as oilite and the like through which a lubricant may be provided to exude to its film contacting surface whereon it facilitates easy passage of the flaring film. Such a ring is represented as the hollow member 37 in Figure 9 to which a film lubricant is admitted through the supply pipe 38. Another satisfactory means, as shown in Figure 10, may comprise a circular air jet 39 having circumferential, film-facing apertures 40 which direct a blast 41 of compressed air or the like which has been interiorly supplied to the jet. This effectively prevents contact of the film with the jet and preserves its condition while facilitating the flaring operation. Or, as illustrated schematically in Figure 11, a hard metal ring 42 such as steel or other suitable alloy which has been polished to a super finished condition on its film contacting periphery may be adequate for the purpose. The type and character of flaring means which is utilized should be selected for its capability, as will be apparent to those skilled in the art, to meet the demands of particular conditions of usage under which it is to be employed.

The flared and stretched film, separated into individual flat sheets 24S, may be subsequently handled by being immediately taken up for collection in finished form in the wound roll packages 29 or as may otherwise be desired. This is illustrated in Figure 2.

In other instances and for various other purposes, as has been indicated, the film handling and processing method may beneficially be combined with other processing or treating steps for the film, including film-forming and post film-forming operations. Several such arrangements are schematically depicted in Figures 12 through 15.

Figure 12:
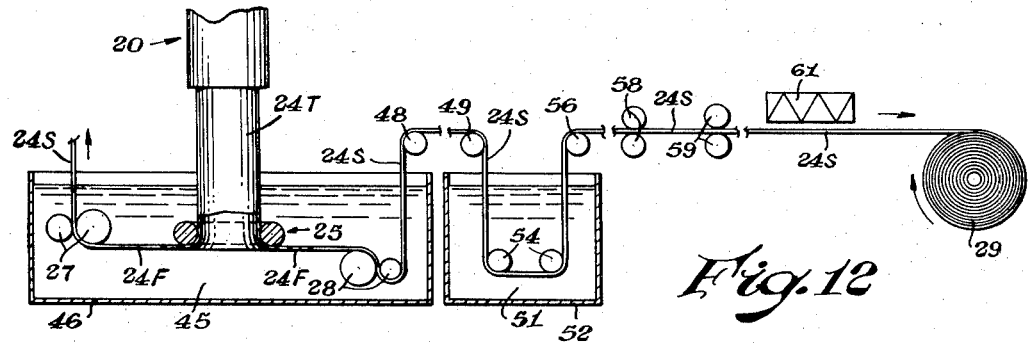

Thus, as shown in Figure 12, a melt-extruded tubular film 24T may, as mentioned, be subject to treatment in a bath 45 of a suitable beneficial treating liquid contained in a trough 46 during the flaring operation before being separated into the individual flat film sheets 24S. In such cases, the treating liquid in the bath 45 may be maintained at a constant and uniform temperature to effect and achieve a precise and closely regulated cooling or other heat treating influence for various desired purposes on the freshly extruded tubular film 24T being flared. Such a bath may be relatively chemically inert to the film which may, if desired, be oriented by stretching under the regulated temperature conditions. Or, if desired, the bath 45 may also be employed to physically or chemically treat the film being flared in a manner which may be additional or supplemental to or independent of temperature regulation. Accordingly, various treating and finishing materials to plastify, soften or impart lubricity to the film may advantageously be applied in the bath 45 as may anti-static materials, fire-retarding agents, certain types of stabilizers, dyestuffs, bleaches and various other treating, impregnating, conditioning or coating agents, or suitable operable and desired mixtures thereof, as may be beneficial under the needs and requirements of particular situations.

The individual separated treated sheets 24S may be withdrawn from the bath 45 over the guide 48 and subsequently handled in any desired fashion in a manner and with apparatus which may be conventionally employed with ordinary flat sheets of linearly formed or tubularly slit film or sheet. The subsequent handling may conveniently be performed in radial processing lines extending outwardly from the central film flaring area, although festooning techniques and vertical processing arrangements may also be suitable. The individual sheets may be withdrawn from the bath and directly collected in rolled packages or as otherwise desired or, as depicted in Figure 12, they may be subsequently handled through various additional processing and finishing steps which may be necessary and conventionally employed or particularly devised for whatever type or variety of formed film which is involved.

Thus, each of the withdrawn sheets 24S may be passed over a subsequent guide 49 or by other suitable means into a further liquid treating bath 51, contained in the trough 52, wherein it is held immersed by the submerged guides 54. The bath 51 may be for purposes of washing, heat treating, hot stretching or any other desired or necessary treatment. The film 24S from the bath 51 may be passed over the guide 56 to additional treatments of any appropriate nature which may include additional liquid treatment or, for example, stretching operations by means of the successive pairs of stretch rolls 58 and 59, operated at different peripheral speeds, or by any other means. Each individual film sheet 24S, with or without such treatment, may be dried with a drier 61 of any suitable type before being taken up for collection in finished form in the wound roll package 29 or otherwise.

Figure 13:
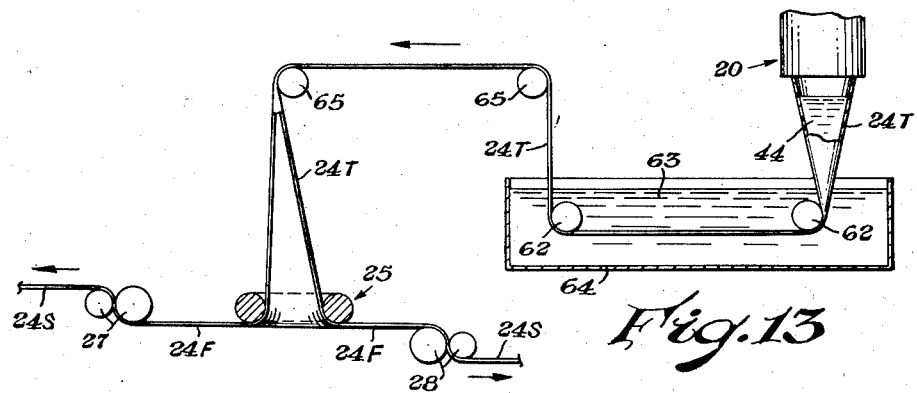

Combined operations may also be practiced in the manner illustrated in Figure 13 wherein the tubular, freshly extruded film 24T is collapsed while being passed around the guide rolls 62 submerged in a liquid treating bath 63 contained in a trough 64. The collapsed tube of film may be subjected to diverse treatments of the discussed varieties in the bath 63. After treatment it may be withdrawn over the guide rolls while remaining in a collapsed form to be passed through the flaring means 25 for handling in accordance with the method of the invention. Film which is handled in this manner may also be additionally treated and processed during or after the flaring operation. It is usually beneficial, when the tubular film 24T is collapsed, to internally lubricate the collapsing tube of film with a suitable lubricant 44 to facilitate its subsequently being opened to an expanded tubular form during the flaring operation.

Figure 14:
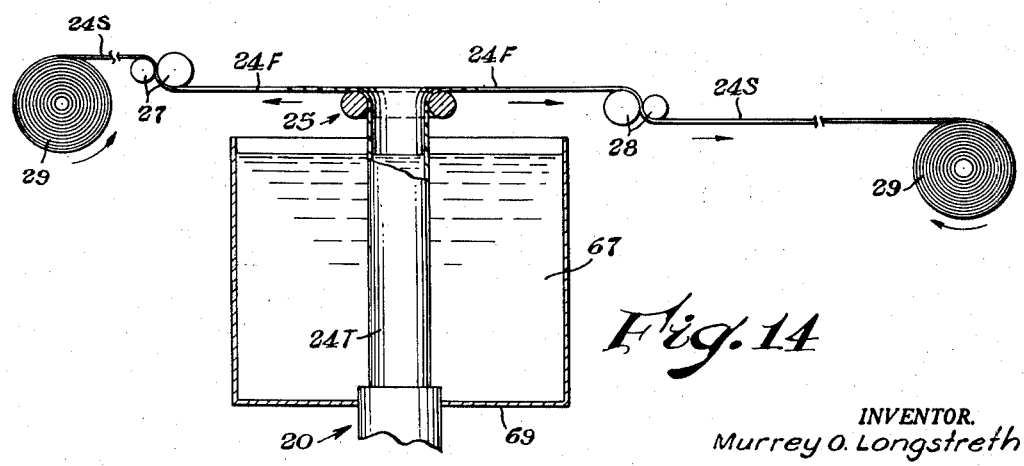
Figure 15:
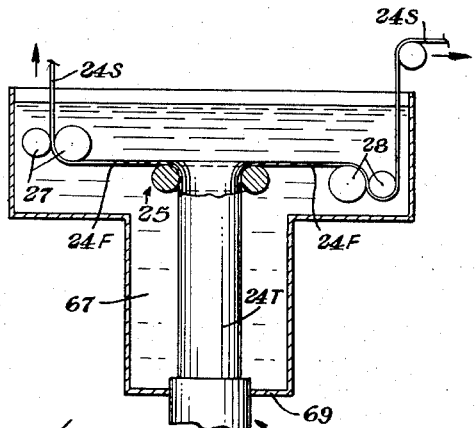

Frequently, a film-forming material may be extruded in tubular form while it is submerged in a treating liquid with the ensuing flaring operation being conducted either after the tubularly formed film is withdrawn from the liquid or while remaining in immersion therein. Such techniques are depicted in Figures 14 and 15. In Figure 14, the tubular film 24T is extruded in the treating liquid 67 contained in the trough 69 with the flaring operation being performed after withdrawal of the tubular film from the liquid. Both the extrusion and flaring are shown in Figure 15 being performed in the treating liquid 67. In many cases it may be beneficial for melt-extrudable film-forming materials to be formed into film according to such techniques in order that desired film treatments can be promptly performed on the freshly extruded film.

In other cases it may be particularly advantageous to prepare a film by extrusion of a wet-extrudable film-forming material in such a manner. Thus, the film forming material may be a coagulable spinning solution, dope or the like which is expressed through the submerged tubular die 20 to be coagulated in the form of the tubular film 24T by the bath 67 of a suitable coagulating or regenerating liquid for the extruded spinning solution. The film, after being flared and separated into individual sheets, may be subsequently handled in any desired sequence, analogous to that illustrated in connection with Figure 12, in order to subsequently process or finish it, or both, into a completed film product in suitable final form.

Figure 16:
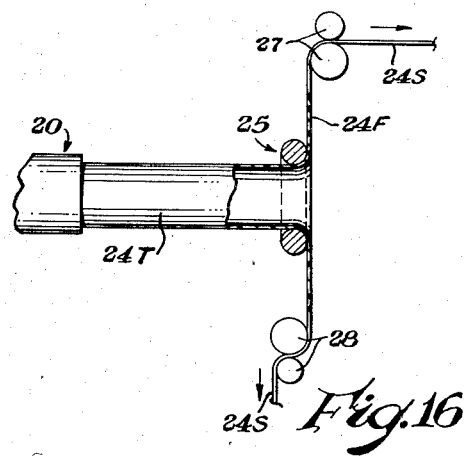

The handling and processing method of the present invention may also be practiced when the tubular film 24T is being passed through a substantially horizontal path to be flared into a substantially vertically disposed discoid sheet for separation, in which case the individual separated sheets 24S may be subsequently handled in either a vertical, horizontal or other desired plane. This is illustrated in Figure 16. Or if desired, various angled planes of passage may be employed for the tubular and flared discoform films.

Figure 17:
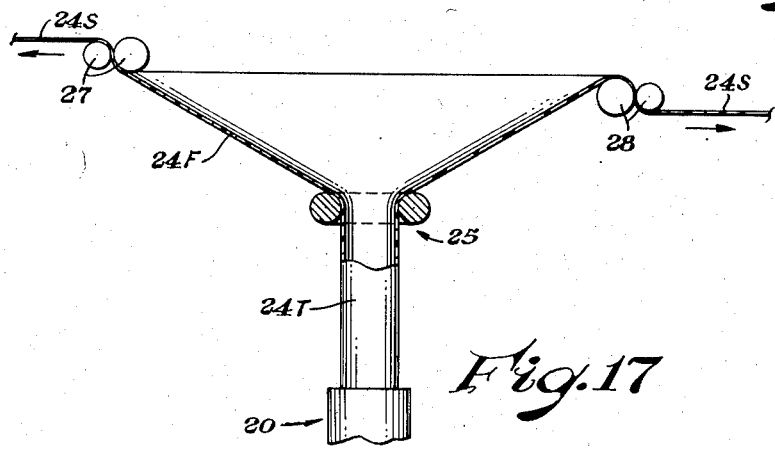
Figure 18:
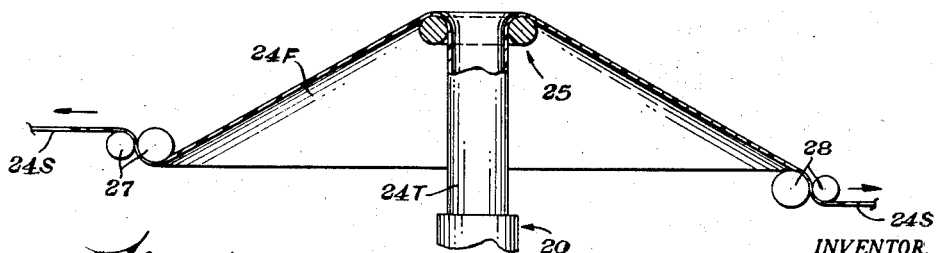

While it may frequently be convenient to utilize a substantially discoplanate flaring effect, it is not necessary to flare the tubular film 24T at right angles or essentially perpendicularly outward into the central, unitary, discoid sheet 24F. As is shown by Figures 17 and 18 the flaring operation may be accomplished with other than a substantially right angled passage through and around the ring-like flaring means. The discoform flaring may be at any desired angle in a direction away from the die, to form the flared, discoform film 24F roughly in the conical pattern or funnel shape shown in Figure 17. In the alternative manner of Figure 18, the flaring operation may be performed by flaring the tubular film 24T about the flaring means 25 at an acute angle in a direction back towards the extruding die 20 to form the discoform film 24F in a funneled shape with somewhat of a mushroom-like configuration.

The method of the present invention is adapted to be practiced with a wide variety of film-forming materials which are ordinarily prepared by various techniques. Typical of some of these are polystyrene, polyethylene, plastified polyvinyl chloride, copolymers of vinyl chloride and vinyl acetate, polymeric ethyl acrylate, polymers and copolymers of acrylonitrile, various sarans, polyamides and polyesters, and certain cellulosic materials including, particularly cellulose acetate and cellulose xanthate in viscose solution. The method of the invention may frequently be beneficially utilized in combination with wet-extruding operations for the preparation of acrylic or regenerated cellulose films and sheets by the adaptation of processing techniques which may be similar to those which are described in connection with Figures 12 and 13.

By way of illustration, polyacrylonitrile and various acrylic copolymeric film-forming spinning solutions may be tubularly extruded into suitable coagulating liquids, such as water, glycol baths, saline solutions and the like depending upon the particular solvent which is employed, before being flared and separated into individual sheets for any desired subsequent processing and handling. Similarly, regenerated cellulose film or foil may be advantageously manufactured by the viscose process as a uniform film product at substantial rates of production. This, for example, might involve extruding a suitable viscose solution into a suitable acid or other coagulating or regenerating bath in the form of tubular film which is flared and slit either in or out of the regenerating bath and subsequently handled through any conventional or desired after processing arrangement for freshly regenerated viscose film. It may, by way of illustration, be re-regenerated or subjected to the influence of a more dilute acid or other coagulating bath in the manner of the viscose process although this may be an optional requirement depending on the nature and conditions of the original film formation. The regenerated film, in the form of the separated, individual flat film sheets, may then sequentially be washed, desulfurized, bleached, washed, dried and collected or any other processing arrangement may be employed. For example, the viscose film may be softened in glycerine or like baths or surface treated with nitrocellulose or equivalent materials, or both. Alternatively, one or more of the post regeneration processing steps may be effected on the tubular film before it is flared either with or without accompanying treatment or several successive flaring operations may be performed with the accompanying treatments being uniformly performed simultaneously with each before slitting the film into the separated, individual flat film sheet form.

Certain changes and modifications can be readily entered into in the practice of the present invention without substantially departing from its intended spirit and scope. Therefore, it is to be fully understood that the invention is not intended nor should it be considered to be limited or in any way restricted by or to the preferred didactic embodiments thereof which are contained in the foregoing description and specification. Rather, the invention is to be interpreted and construed in the light of what is set forth and defined in the hereto appended claims.

What is claimed is:

1. Method for handling and processing tubular film into flat film sheets and the like which comprises extruding a film-forming material into a tubularly formed film; omniradially flaring the tubularly formed film outwardly from a center through a ring-like flaring means as a unitary thin sheet being conducted in a discoid form; slitting the moving discoform flared sheet radially at fixed points spaced about its circumference and at about equal distances from the flaring means; grasping each of the thus-separated sheets individually and conveying them away from the center at a linear rate at least as great as the rate of formation of the central unitary sheet from the flared tubular film; and subsequently handling each of the thus-separated sheets as a unidirectionally formed, flat film sheet.

2. In the method of claim 1, conveying the separated sheets radially away from the center at a linear rate which is greater than the rate of formation of the central, unitary sheet from the flared tubular film to effectively uniformly stretch said central sheet a substantially equal amount in all directions in its major plane simultaneous with its formation.

3. In the method of claim 1, flaring said tubularly formed film outwardly in a discoid plane.

4. In the method of claim 1, flaring said tubularly formed film outwardly in a funneled discoid form.

5. In combination with the method of claim 1, flaring the tubular film while it is immersed in a bath of a benficial treating liquid which is a temperature regulating bath for the film.

6. In combination with the method of claim 1, flaring the tubular film while it is immersed in a bath of a beneficial treating liquid which is a chemical treating bath for the film.

7. In combination with the method of claim 1, flaring the tubular film while it is immersed in a bath of a beneficial treating liquid which is a coating bath for applying a layer of adhering material to the surface of the film.

8. The method of claim 1 including the additional step of collapsing the tubularly formed film for treatment before it is omniradially flared to form said unitary sheet in a discoid form.

9. The method of claim 1 wherein the subsequent handling of the separated sheets includes subsequential processing and finishing treatments for extruded films of said film-forming material.

10. In the method of claim 1, extruding a molten composition of a film-forming material into said tubularly formed film.

11. In combination with the method of claim 1, extruding said film-forming material in a bath of a beneficial treating liquid while forming said tubularly formed film.

12. A method in accordance with the method set forth in claim 11, wherein said tubularly formed film is flared after being withdrawn from said bath.

13. A method in accordance with the method set forth in claim 11, wherein said tubularly formed film is flared while remaining submerged in said bath.

14. In the method of claim 1, extruding a coagulable, film-forming solution of a film-forming material into a bath of a coagulating liquid for said film-forming solution to form said tubularly formed film.

15. In the method of claim 1, extruding a coagulable, film-forming solution of a film-forming material into a bath of a coagulating liquid for said film-forming solution to form said tubularly formed film and subsequently handling the separated sheets in the maner of subsequential processing and finishing treatments for wet-extruded films of said film-forming material.

16. In the method of claim 1, extruding a wet-extrudable, coagulable acrylic film-forming solution into a coagulating bath for said solution to form said tubularly formed film and subsequently handling the separated sheets in the manner of subsequential processing and finishing treatments for wet-extruded acrylic films.

17. In the method of claim 1, extruding a film-forming viscose solution into a regenerating liquid for viscose to form a tubular regenerated cellulose film and subsequently handling the separated sheets in the manner of subsequential processing and finishing treatments for extruded viscose films according to regenerated cellulose film manufacturing techniques.

18. Method for handling and processing tubular film into flat film sheets and the like which comprises extruding a film-forming material into a tubularly formed film; omniradially flaring the tubularly formed film outwardly through a ring-like flaring means as a unitary thin sheet in a discoid form; conducting the resulting discoform, unitary, central sheet into contact with a plurality of cutters disposed about equidistant from the center and spaced approximately symmetrically thereabout at angles of a circumscribing polygon to form a plurality of sheets having individually fixed widths which extend outwardly from the unitary central sheet; engaging each of the individual sheets in the bight of a corresponding set of draw rolls having essentially the same width as the engaged sheet, the several sets of rolls describing a closed polygon concentric with said center; driving all of said sets of rolls at the same peripheral speed to effect continuous and substantially uniform omnidirectional stress and tension in the major plane of said unitary, central sheet and in each of said outwardly extending sheets; and subsequently handling each of the outwardly extending sheets as a unidirectionally formed flat film sheet.

19. In the method of claim 18, the several sets of rolls describing a closed regular polygon of at least six sides.

20. In the method of claim 18, the several sets of rolls describing a regular octagon.

References Cited in the file of this patent

UNITED STATES PATENTS

| | | |
|---|---|---|
| 1,654,253 | Henderson | Dec. 27, 1927 |
| 2,452,080 | Stephenson | Oct. 26, 1948 |
| 2,779,053 | Longstreth et al. | Jan. 29, 1957 |

FOREIGN PATENTS

| | | |
|---|---|---|
| 744,977 | Great Britain | Feb. 15, 1956 |